July 5, 1932.   H. D. GEYER   1,865,465
FILLER DEVICE
Filed May 2, 1930

Inventor
Harvey D. Geyer
By Spencer Hardman & Fehr
His Attorneys

Patented July 5, 1932

1,865,465

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

FILLER DEVICE

Application filed May 2, 1930. Serial No. 449,210.

This invention relates to closures for filler openings in tanks or the like, especially for filler openings on gasoline tanks for automobiles.

An object of the invention is to provide a very simple yet efficient closure means which cannot be removed entirely from the tank by gasoline filling station attendants, whereby the cap cannot be lost by careless attendants and the likelihood of their forgetting to properly replace the cap is lessened.

Further objects and advantages of the present invention will be apparent from the following description, reference being had to the accompanying drawing wherein a preferred embodiment of one form of the present invention is clearly shown.

In the drawing.

Similar reference characters refer to similar parts throughout the various views.

Figure 1:
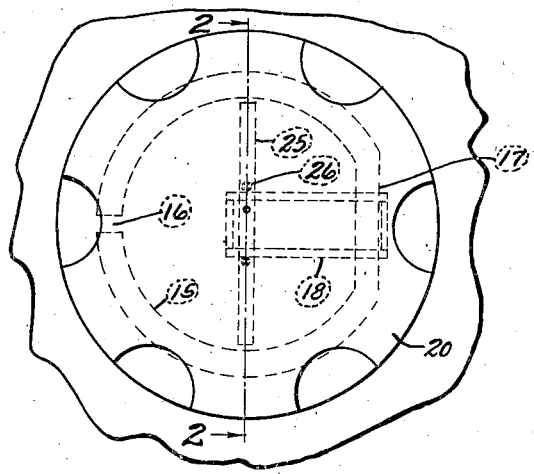
Fig. 1 is a plan view of the closure cap and shows in dotted lines the outline of the hinge mechanism.

Numeral 10 designates the upstanding filler duct for the gasoline tank of an automobile. It has an inwardly turned flange 11 at its upper periphery, which flange 11 has two diametrically opposed slots 12 therein which form part of a bayonet joint described herebelow. Filler duct 10 has an internal peripheral groove 13 formed in the metal thereof within which a spring wire ring 15 fits so as to be retained in place therein, but sufficiently free to be easily rotated without excessive friction. This ring 15 is split at 16 so that its ends may be made to overlap and so reduce the diameter of the ring to enable it to be inserted through the smaller opening caused by the internal flange 11. Upon its insertion the resiliency of the spring wire will cause it to snap back to its original form and so it will be properly retained in groove 13. Preferably the ring 15 has a straight portion 17 upon which is hinged one end of the small curved link 18. Link 18 is preferably a sheet metal stamping, as clearly shown in the drawing.

Figure 2:
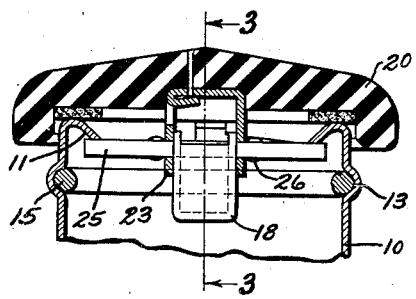
Fig. 2 is a vertical section on line 2—2 of Fig. 1.
Figure 3:
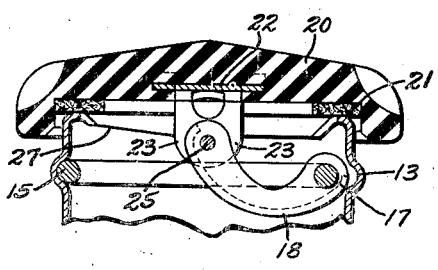
Fig. 3 is a vertical section on line 3—3 of Fig. 2.
Figure 4:
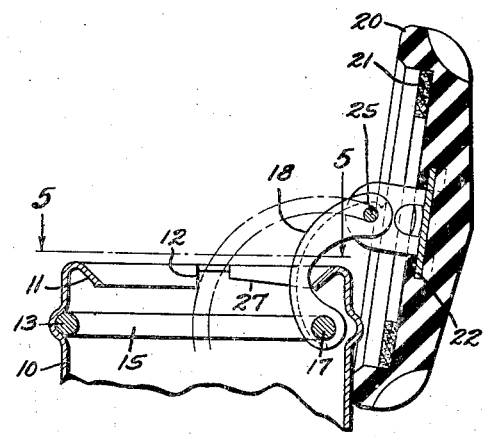
Fig. 4 is a view similar to Fig. 3, but shows the cap rotated through 90 degrees and swung wide open.

The closure cap 20 has a suitable gasket 21 attached thereto on its under side which provides a proper seal between cap 20 and the upper edge of duct 10, as clearly shown in Figs. 2 and 3. Cap 20 may be of any suitable construction, but preferably is of molded non-metallic material such as hard rubber. A stamped metal central bracket 22 is rigidly fixed in place, preferably by being molded in situ in the molded material. Bracket 22 has two spaced depending ears 23 which engage opposite sides of one end of link 18 and is secured thereto by the cross pin 25 which extends through registering apertures in ears 23 and the flanges of link 18. Pin 25 may be suitably held against endwise slipping by small lugs 26 thereon (see Fig. 1) which may be made by upsetting the metal.

Figure 5:
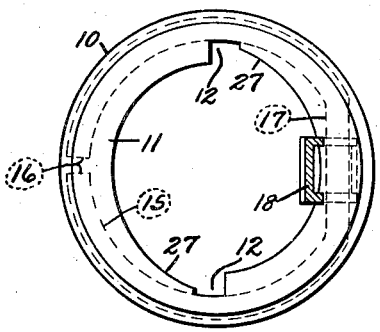
Fig. 5 is a plan view of the inlet duct, and is taken on line 5—5 of Fig. 4.

It will now be clear that cap 20 together with link 18 may be swung about the hinge connection 17 to open or closed positions. When cap 20 is swung closed, the projecting ends of pin 25 pass through the two slots 12 in flange 11, after which the cap 20 together with its link 18 and ring 15 are given a quarter-turn to cause the ends of pin 25 to engage the under-side of flange 11 and thus retain the cap clamped down (see Fig. 2). Preferably the bottom edge of flange 11 is inclined downwardly as at 27 (see Fig. 5) so that when the cap 20 is given the above described quarter-turn, the ends of pin 25 will engage these inclined edges 27 and give a down clamping action to cap 20 when said cap is simply rotated by hand.

By this invention a fuel tank cap or radiator cap may be quickly and easily removed to provide free access to the inlet by filling station attendants, and likewise quickly and easily replaced in a clamped, closed position. The simplicity, efficiency and small cost of the construction comprises the essence of the invention.

While the form of the present invention as herein disclosed, constitutes a preferred form; it is to be understood that other forms might be adopted, all coming within the scope of the claims which follow.

What is claimed is as follows:

1. A filler device for a tank comprising: an upstanding tank inlet duct having an inturned peripheral flange adjacent its upper edge, said flange having a slot therein, said duct having a ring rotatably supported therein below said flange, a closure cap for said duct having a hinge link hinged upon said rotatable ring and swingable thereupon to open and closed positions, said cap having a radially outward projecting lug movable through said slot to a position under said flange when the cap is in closed position, to retain said cap in place.

2. A filler device for a tank comprising: an unstanding tank inlet duct having an inturned peripheral flange adjacent its upper edge, said flange having a slot therein, said duct having an internal peripheral groove therein below said flange, a ring rotatably supported within said groove, a closure cap for said duct having a member extending down into said duct and hinged upon said ring and swingable thereupon to open and closed positions, said cap having an outwardly projecting lug swingable through said slot to a position under said flange when the cap is closed, and engaging the under side of said flange when the cap is thereafter rotated through a small angle.

3. A filler device for a tank comprising: an upstanding inlet duct having an internal peripheral groove therein, a ring rotatable within said groove, a closure cap for said duct having a link extending down into said duct and hinged upon said ring and rotatable therewith, said cap being swingable upon said hinge connection to open and closed positions, and means for securing said cap in closed position by a small rotation thereof when closed.

In testimony whereof I hereto affix my signature.

HARVEY D. GEYER.